(12) United States Patent
Bourlatchkov et al.

(10) Patent No.: US 8,175,862 B1
(45) Date of Patent: *May 8, 2012

(54) MODEL-BASED SYSTEMS AND METHODS FOR MONITORING RESOURCES

(75) Inventors: Dmitri Bourlatchkov, Toronto (CA); Brendan Behan, Toronto (CA); Yu Li, Toronto (CA); Nils Meier, Toronto (CA); Leo Pechersky, Thornhill (CA); Steven P. Rosenberg, Toronto (CA); Geoff Vona, Toronto (CA)

(73) Assignee: Quest Software, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/179,405

(22) Filed: Jul. 8, 2011

Related U.S. Application Data

(63) Continuation of application No. 11/749,559, filed on May 16, 2007, now Pat. No. 7,979,245.

(60) Provisional application No. 60/801,232, filed on May 17, 2006.

(51) Int. Cl.
*G06F 17/50* (2006.01)
(52) U.S. Cl. ......................................... 703/14
(58) Field of Classification Search .................... 703/14; 709/224, 223
See application file for complete search history.

(56) References Cited

U.S. PATENT DOCUMENTS

| | | |
|---|---|---|
| 3,701,971 A | 10/1972 | Sanner et al. |
| 3,839,707 A | 10/1974 | Woodward et al. |
| 4,468,728 A | 8/1984 | Wang |
| 4,683,532 A | 7/1987 | Yount et al. |
| 4,937,740 A | 6/1990 | Agarwal et al. |
| 5,103,394 A | 4/1992 | Blasciak |
| 5,321,838 A | 6/1994 | Hensley et al. |
| 5,375,199 A | 12/1994 | Harrow et al. |
| 5,432,932 A | 7/1995 | Chen et al. |
| 5,450,586 A | 9/1995 | Kuzara et al. |
| 5,493,658 A | 2/1996 | Chiang et al. |
| 5,517,629 A | 5/1996 | Boland |
| 5,528,753 A | 6/1996 | Fortin |
| 5,539,907 A | 7/1996 | Srivastava et al. |
| 5,600,789 A | 2/1997 | Parker et al. |

(Continued)

OTHER PUBLICATIONS

"Instance Monitor The Real-Time Database Monitoring and Diagnostic Solution for Oracle," Brochure, Quest Software, Inc. 1999, 2 pages.

(Continued)

*Primary Examiner* — Dwin M Craig
*Assistant Examiner* — Bernard E Cothran
(74) *Attorney, Agent, or Firm* — Knobbe, Martens, Olson & Bear, LLP

(57) ABSTRACT

Modeling systems and methods for constructing one or more models of a computing system using collected data. Certain model-based systems build topology models and/or model instances by transforming collected performance data into a collection-location independent form. In certain examples, systems include at least one agent for collecting performance data from monitored resource(s), canonical data transform (CDT) configurations, and a data transformation module for performing data transform operation(s) on the performance data based on at least one CDT configuration. The data transform operation may include generating and/or updating a topology model, assigning metrics to model object(s), updating properties of model object(s), creating associations between existing model objects, or the like. Certain systems and methods also allow for a single piece of data to be processed by multiple models or for pieces of data collected from different locations to be matched and/or associated with the same model object.

20 Claims, 8 Drawing Sheets

U.S. PATENT DOCUMENTS

| | | | |
|---|---|---|---|
| 5,649,187 A | 7/1997 | Hornbuckle | |
| 5,671,351 A | 9/1997 | Wild et al. | |
| 5,673,386 A | 9/1997 | Batra | |
| 5,684,945 A | 11/1997 | Chen et al. | |
| 5,708,775 A | 1/1998 | Nakamura | |
| 5,715,388 A | 2/1998 | Tsuchihashi | |
| 5,715,415 A | 2/1998 | Dazey et al. | |
| 5,720,018 A | 2/1998 | Muller et al. | |
| 5,740,357 A | 4/1998 | Gardiner et al. | |
| 5,748,881 A | 5/1998 | Lewis et al. | |
| 5,752,062 A | 5/1998 | Gover et al. | |
| 5,768,501 A | 6/1998 | Lewis | |
| 5,872,909 A | 2/1999 | Wilner et al. | |
| 5,881,306 A | 3/1999 | Levine et al. | |
| 5,903,453 A | 5/1999 | Stoddard, II | |
| 5,903,898 A | 5/1999 | Cohen et al. | |
| 5,911,048 A | 6/1999 | Graf | |
| 5,960,425 A | 9/1999 | Buneman et al. | |
| 5,978,594 A | 11/1999 | Bonnell et al. | |
| 5,983,366 A | 11/1999 | King | |
| 6,029,170 A | 2/2000 | Garger et al. | |
| 6,035,412 A | 3/2000 | Tamer et al. | |
| 6,128,016 A | 10/2000 | Coelho et al. | |
| 6,199,199 B1 | 3/2001 | Johnston et al. | |
| 6,330,008 B1 | 12/2001 | Razdow et al. | |
| 6,351,754 B1 | 2/2002 | Bridge et al. | |
| 6,594,655 B2 | 7/2003 | Tal et al. | |
| RE38,270 E | 10/2003 | Nakajima | |
| 6,771,646 B1 | 8/2004 | Sarkissian et al. | |
| 6,901,582 B1 | 5/2005 | Harrison | |
| 7,127,324 B2 | 10/2006 | Batori et al. | |
| 7,363,211 B1 | 4/2008 | Naganathan et al. | |
| 7,784,027 B2 | 8/2010 | Harrison | |
| 7,979,245 B1 * | 7/2011 | Bourlatchkov et al. | 703/2 |
| 2003/0009551 A1 | 1/2003 | Benfield et al. | |
| 2003/0028630 A1 | 2/2003 | Bischof et al. | |
| 2004/0059812 A1 | 3/2004 | Assa | |
| 2005/0021743 A1 | 1/2005 | Fleig et al. | |
| 2011/0047496 A1 | 2/2011 | Harrison | |

OTHER PUBLICATIONS

Boucher et al., Essential Guide to Object Monitors, Mar. 1999, whole book.

Dewan, et al. "A High-Level and Flexible Framework for Implementing Multiuser User Interfaces", 1992, ACM, p. 345-380.

Distributed Management Task Force, Inc., "Common Information Model (CIM) Infrastructure Specification"; Version 2.3 Final; Oct. 4, 2005; 102 pages.

Harrison, "Oracle SQL High-Performance Tuning," Prentice Hall PTR, 1997.

Hitachi TP Broker User's Guide, Release 3.1, 1998, entire manual.

Laessig; "Score Big with JSR 77, the J2EE Management Specification", Javaworld; Jun. 14, 2002; 8 pages.

Muller, Focus on HP OpenView: A Guide to Hewlett Packard's Network Management Platform, 1995, entire book.

Savant Corporation, "Products," http://www.savant-corp.com/prods.html, 1 page downloaded from the World Wide Web on Nov. 16, 1999.

Savant Corporation, "Products," http://www.savant-corp.com/prods.html, 1 page, downloaded and printed from the World Wide Web on Feb. 15, 2000.

Savant Corporation, "Q Application Diagnostics," http:///savant-corp.com/qappd.html, 1 page, downloaded and printed from the World Wide Web on Nov. 16, 1999.

Savant Corporation, "Q Hot SQL," http:///www.savant-corp.com/qhsql.html, 1 page, downloaded and printed from the World Wide Web on Nov. 16, 1999.

Savant Corporation, "Q Instance Overview," http:///www.savant-corp.com/qiov.html, 1 page, downloaded and printed from the World Wide Web on Nov. 16, 1999.

Savant Corporation, "Q Job Queue Manager," http:///www.savant-corp.com/qjobq.html, 1 page, downloaded and printed from the World Wide Web on Nov. 16, 1999.

Savant Corporation, "Q Lock Manager," http:///www.savant-corp.com/qlock.html, 1 page, downloaded and printed from the World Wide Web on Nov. 16, 1999.

Savant Corporation, "Q Replay Viewer," http:///www.savant-corp.com/qreplay.html, 1 page downloaded and printed from the World Wide Web on Nov. 16, 1999.

Singh et al; "Designing Web Services with the JDEE™ 1.4 Platform," Chapter 6 (pp. 247-289), May 2004; 46 total pages.

Tang, et al. "Blending Structured Graphics and Layout", 1994, ACM, p. 167-174.

Harrison, Guy, "Building a High-Performance Oracle Database Server," and "Tuning the Database Server," in: "Oracle SQL High-Performance Tuning," (New Jersey. Prentice-Hall, 1997), pp. 363-364, 399-400.

* cited by examiner

MODEL-BASED SYSTEMS AND METHODS FOR MONITORING RESOURCES

RELATED APPLICATION

This application is a continuation of U.S. application Ser. No. 11/749,559, filed May 16, 2007, now U.S. Pat. No. 7,979, 245 entitled "MODEL-BASED SYSTEMS AND METHODS FOR MONITORING RESOURCES", and claims the benefit of priority under 35 U.S.C. §119(e) of U.S. Provisional Application No. 60/801,232, filed on May 17, 2006, and entitled "MODEL-BASED PERFORMANCE MANAGEMENT TECHNIQUES FOR MODERN APPLICATIONS," the entirety of which are hereby incorporated herein by reference.

BACKGROUND OF THE INVENTION

1. Field of the Invention

Embodiments of the invention generally relate to monitoring computer systems and, in particular, to systems and methods for model-based monitoring of performance data.

2. Description of the Related Art

Information technology (IT) specialists, or system administrators, are responsible for monitoring, maintaining, protecting and configuring computer systems and their resources. System administrators are often asked to provide access to these resources at practically any time of the day while ensuring the system's integrity is not threatened by dataflow bottlenecks or excessive overhead.

To aid administrators in ensuring accessibility and system integrity, many computer systems provide performance data in the form of reports, query-accessible tables, printouts, and the like. Traditional data monitoring of such computer systems is generally focused on whether certain modules are running and/or actions required to ensure that modules are running.

As computer systems and their applications have become more complex and relied upon more heavily by businesses, the demands on system administrators have increased. However, traditional monitoring systems are oftentimes designed for substantially static IT systems, being inflexible to change, and require significant manual intervention. For instance, traditional monitoring systems often include hard-coded, inflexible policies that are individually assigned to each of thousands of changing nodes of a computer system. Moreover, addition of new elements to the computer system often requires adjustments to several, if not all, of the existing policies of the monitoring system.

Moreover, traditional monitoring generally organizes performance data by point of collection. That is, there often exists a one-to-one correlation between a logical host of the monitoring system and a physical host device of the monitored system. These traditional monitoring systems also often store monitored data in a single table and perform data correlation inside that table.

Data received from the monitoring systems can further be used in performance management of the computer system. Such management includes: keeping the system running, making the system run faster, allocating more data on fewer parts, design, capacity planning, profiling, diagnosis and the like. While data monitoring is generally concerned with how modules are performing, performance management focuses more on keeping a computing system running over time.

SUMMARY OF THE INVENTION

In view of the foregoing, a need exists for improved systems and methods for monitoring performance data of a computer system. Moreover, a need exists for model-based systems and methods configured to build one or more models, including topology model instances, by transforming collected performance data into a collection-location independent form. For example, there is a need for modeling systems and methods that classify data based on the form of the data being monitored instead of, or in addition to, the form of the data collector.

Certain systems and methods are disclosed herein for constructing one or more models of an underlying computing system using collected data. For example, embodiments of the invention include model-based systems and methods for building topology models and/or model instances by transforming collected performance data into a collection-location independent form. Moreover, certain modeling systems and methods disclosed herein transform collected performance data to represent what is sending the performance data irrespective of the form of the monitored resource(s). In certain embodiments, such systems and methods allow for more flexibility in performing monitoring and/or performance management of data across one or more domains.

In certain embodiments, a method is disclosed for dynamically modeling performance data in a computing environment. The method comprises receiving performance data collected by at least one agent module from one or more resources and accessing a first model template, wherein a structure of the first model template reflects an expected structure of the performance data independent of where the performance data was collected by the at least one agent module. The method further comprises generating a modified model based at least in part on the performance data and the first model template, the modified model having a plurality of topology objects, and storing the modified model in a data repository (e.g., a database).

In certain embodiments, a system is disclosed for monitoring data in a computing environment. The system comprises an agent module configured to obtain raw data from at least one resource and a database storing a data transform configuration, the data transform configuration having a structure indicative of an anticipated structure of the raw data irrespective of where the raw data was collected by the agent module. The system further comprises a data transformation module configured to receive the raw data collected by the agent module and to transform the raw data into a topology model based at least on the data transform configuration, the topology model comprising a plurality of interconnected topology objects.

In certain embodiments, a method is disclosed for obtaining data for use in modeling a computing environment. The method comprises obtaining, with one or more agents, raw data regarding the performance of one or more resources in a computing environment and providing the raw data to an agent framework module. The method further comprises converting, with the agent framework module, the raw data into standardized data in the form of a raw data tree having a plurality of data nodes, the raw data tree having a structure independent of where the raw data was collected by the one or more agents and transmitting the standardized data for processing by a data transformation module for generating a model based at least in part on the standardized data.

In certain embodiments, a system is disclosed for dynamically modeling performance data in a computing environment. The system comprises means for collecting performance data from one or more resources and means for accessing a first model template, wherein a structure of the first model template reflects an expected structure of the performance data independent of where the performance data was collected by said means for collecting. The system further comprises means for generating a modified model based at least in part on the performance data and the first model template, the modified model having a plurality of topology objects and means for storing the modified model.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

Figure 1:
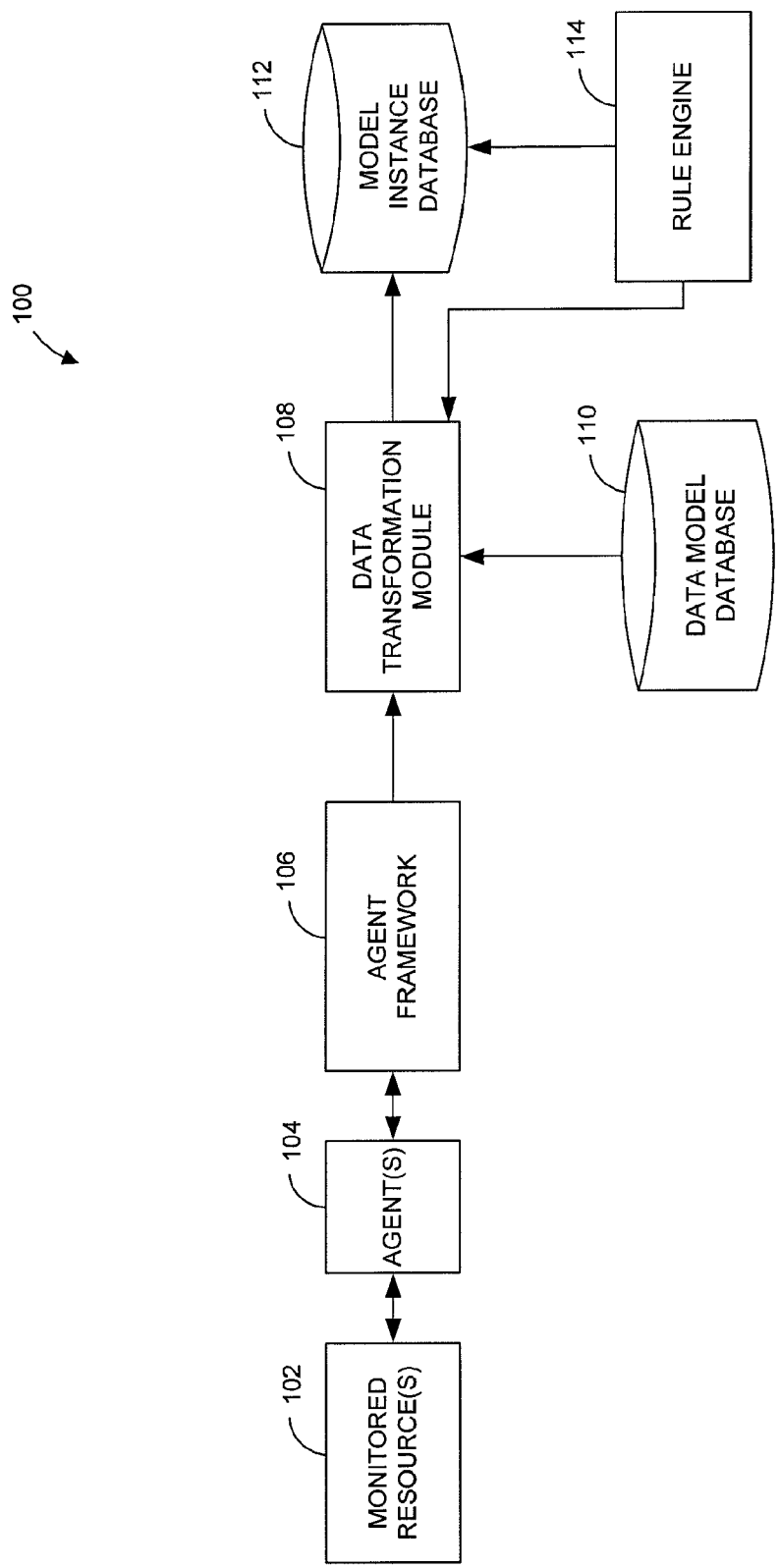
FIG. 1 illustrates a block diagram of a modeling system usable for monitoring and/or managing data according to certain embodiments of the invention.

Embodiments of the inventions disclosed herein are designed to account for the increasing complexity of monitoring computing systems. In particular, certain disclosed systems and methods provide for flexible and customizable model-based monitoring that accurately depicts complex and/or dynamically changing computing environments. For example, in certain computing environments, a host may actually be a logical host representing an active-passive cluster, one of a cluster of hosts arbitrarily grouped together, a virtual host running on a physical host, combinations of the same or the like. Moreover, a host may change its IP address or domain dynamically over a period of time.

Such complexity introduces two problems for monitoring systems. First, the relationship between physical devices and corresponding logical representations needs to be preserved, or the host data becomes meaningless. Second, the property information of the monitored resources should be tracked. For example, changes to the properties of particular resources could require groupings resources to change.

An example of problems with traditional monitoring is shown in the following scenario having web server X and web server Y that each call application server A. Suppose web server X has a caching error that causes too many calls (e.g., 26,000 calls) to application server A, while web server Y rarely calls application server A (e.g., 23 calls). While monitoring each of these resources, if the relationships are not preserved of the data flow between web server X, web server Y and application server A, the result is simply a call count for application server A.

Embodiments of the invention address these and other drawbacks of traditional monitoring systems. For example, as will be described in more detail herein, embodiments of the invention include systems and methods for using dynamically discovered dependency models to provide an accurate and current representation of an IT environment. In such embodiments, application and services management is advantageously accomplished to manage virtualization and a service-oriented architecture.

Certain systems and methods are disclosed herein for constructing one or more models of an underlying computing system using collected data. For example, embodiments of the invention include model-based systems and methods for building topology models and/or model instances by transforming collected performance data into a collection-location independent form. Moreover, certain modeling systems and methods disclosed herein classify data based on the form of the data being monitored instead of the form of the monitored resource(s). In certain embodiments, such systems and methods allow for more flexibility in performing monitoring and/or performance management of data across one or more domains.

In certain embodiments, the model-based systems and methods disclosed herein provide for several advantages. For example, constructed models can represent particular metrics in the context of the physical or logical organization of what is being monitored. Configuration changes can also be tracked and put in context at runtime. Moreover, various constructed models can be combined and/or can be changed without substantially impacting persistence or rules.

For example, in certain embodiments, systems and methods disclosed herein allow for IT personnel to use predefined and/or customized models to reflect specific role-based views. For instance, certain embodiments of the invention advantageously build multiple models using the same data and/or construct models for related domains (e.g., Portal and J2EE, or PeopleSoft and J2EE). Models constructed by certain embodiments of the invention can closely match what a user would produce if asked to "draw" their system. The model can also allow for user interface (UI) navigation of the underlying system.

Moreover, certain embodiments allow for the attachment of policies, views and/or reports to these models for enhanced flexibility and personalization. In certain embodiments, as new elements are added to a computer system, they can automatically be monitored based on service model context and/or automatically adopt the policies of their associated clusters, substantially reducing the need for manual administration and the potential for a management blind spot.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods, functions and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

FIG. 1 illustrates an exemplary embodiment of a modeling system 100 for monitoring and/or managing data of one or more monitored resources 102. In certain embodiments, the modeling system 100 advantageously uses collected raw data to generate and/or modify one or more models of the monitored system, wherein each model provides a specific way of organizing the gathered data.

In certain embodiments, the models created and/or used by the modeling system 100 are made up of objects associated with metrics (e.g., time series data) relationships, properties (e.g., an attribute that does not change frequently), combinations of the same or the like. In certain embodiments, a property can represent a single item or a list of multiple items. In further embodiments, one or more relationships, metrics, alarms, and/or changes may be implemented or represented as a property.

In certain embodiments, the monitored resource(s) 102 comprise any device, system, and/or module (software or hardware) that handles data. For instance, the monitored resource may comprise a web server, application server, database, application, processor, memory, Enterprise Java Bean (EJB), servlets, Java Server Pages, database tables, tablespaces in a database, application tiers, combinations of the same or the like.

As shown, the modeling system 100 comprises agent(s) 104 in communication with the monitored resource 102. The agent 104 is configured to collect data (e.g., performance data) associated with the monitored resource(s) 102. In certain embodiments, the agent 104 is a data-specific agent and is configured to gather a particular type of data. For example, the agent 104 can be configured to obtain several samples of a particular type of data during a preprogrammed collection period. In other embodiments, the agent 104 can be configured to monitor the data of a particular host device or module. In certain embodiments, multiple agents 104 can be associated with a single monitored resource 102. A single agent 104 can also be associated with multiple monitored resources 102.

In certain embodiments of the invention, the agent 104 comprises a discovery agent and/or a monitoring agent. A discovery agent is adapted to collect information about the configuration of the monitored resource(s) 102. For instance, the discovery agent can be configured to produce data that represents relationships between various objects of the monitored resource(s) 102. The monitoring agent is adapted to record changes to data associated with the monitored resource(s) 102. For instance, monitoring agents can be configured to collect information regarding changes in data flow, disk space, system calls, combinations of the same or the like.

The agent 104 passes data to an agent framework 106. In certain embodiments, the agent framework 106 receives raw (e.g., unprocessed) data from the agent 104, such as is in the form of a raw data tree. The agent framework 106 is designed to standardize the raw data received from the agent(s) 104 to prepare the data for additional processing and/or correlation. For instance, the agent framework 106 can encapsulate agent communication protocol details and, accordingly, convert the data received from the particular agent(s) 104 into a standard form.

For example, in embodiments wherein the agent 104 is collecting PerformaSure data, the agent framework 106 may receive the raw data in the form of tree data embedded in a binary format. In order to standardize the data, the agent framework 106 converts the tree data into an object format usable by the modeling system 100.

FIG. 1 further illustrates a data transformation module 108 in communication with the agent framework 106 and a data model database 110. In certain embodiments, the data transformation module 108 is configured to further process the standardized data received from the agent framework 106. For example, the data transformation module 108 can be configured to separate agent data into two general categories: topology information and observations. In certain embodiments, from an application performance and/or monitoring perspective, the topology information describes the resources being monitored (e.g., a "host" or a "servlet"). For example, topology information can dictate the manner in which the collected data is structured.

Observations are measurements or samples that relate to some aspect of an entity in the topology (e.g., "CPU usage" or "call count"). In certain embodiments, the modeling system 100 supports various observation types, such as, for example, metrics, properties or the like.

In certain embodiments, the data transformation module 108 processes the standardized data to create and/or modify one or more objects in one or more models based on a set of definitions stored in the data model database 110. In certain embodiments, the standardized data is used to attach metrics to an existing model. In yet other embodiments, the data transformation module 108 can discard the data. In certain embodiments, the data transformation module 108 stores a new or modified topology model (or a defined model instance) in a model instance database 112.

For instance, in certain embodiments, the data received from the agent framework 106 is assembled into a hierarchy of nodes that group observations for a single topology object. It is to be noted that there is not necessarily a direct correspondence between the hierarchy of nodes of the standardized data and the relationships that exist in a topology model representing monitored resources. Instead, the hierarchy structure is dependent on the structure of the data provided by the agent(s) 104 and one or more definitions that specify how the data is to be processed.

The illustrated modeling system 100 further comprises a rule engine 114 in communication with the data transformation module 108 and the model instance database 112. In certain embodiments, the rule engine 114 is configured to apply policies and/or rules to data in the data transformation module 108 and/or the model instance database 112. In certain preferred embodiments, the rule engine interacts with in-memory instances of models generated by the modeling system 100.

Rules can advantageously comprise one or more expressions written in an embedded scripting language (e.g., Groovy). In certain embodiments, rules from the rule engine 114 operate in the context of a node (e.g., metrics and variables of a node) in a model. In particular, rules can be associated with nodes in a model instance and/or topology types in the particular model. Rules can also be used to create derived metrics and/or cache data locally to enable more efficient execution.

In certain embodiments, rules can subscribe to data and are evaluated when the data arrives. In other embodiments, rules can be time-triggered.

As will be understood from the present disclosure, in certain embodiments, the modeling system 100 depicted in FIG. 1 is advantageously configured to perform model-based monitoring by applying object-oriented principals to a particular monitoring domain. For example, the modeling system 100 can be configured to organize the monitored data by the particular monitored resource, such as by grouping data into an object of a particular type. Data collected by different agents can even reside in the same topology object of a model.

Such modeling advantageously allows for correlation between types of data to be implicit in the location of the data within the model.

In certain embodiments, once the data is transformed and placed in a particular model, the original collection context is no longer important. For instance, the data need not be stamped or otherwise identified by where it was collected. Such embodiments also advantageously allow for remote or touchless collection and/or cluster collection.

As will be appreciated, the modeling system 100 is advantageously designed to provide an improved data management environment. For instance, generated models may be used to reduce false alerts, diagnose speed and/or uncover trends (e.g., between metrics and properties or between properties and properties). The modeling system 100 can also be configured to separate the context of the collected data from the data itself, allow the same piece of data to be used in different ways by different models, allow different users to have different views of the same piece of data, combinations of the same or the like.

Other benefits of the modeling system 100 include the generation of models that are capable of responding in real-time to changes in the monitored computing environment, such as by changing as new entities come online in a monitored system or as new types of data collection are enabled. In yet other embodiments, the data transformation definitions received from the data model database 110 can change based on data collected by the agent 104.

Figure 2:
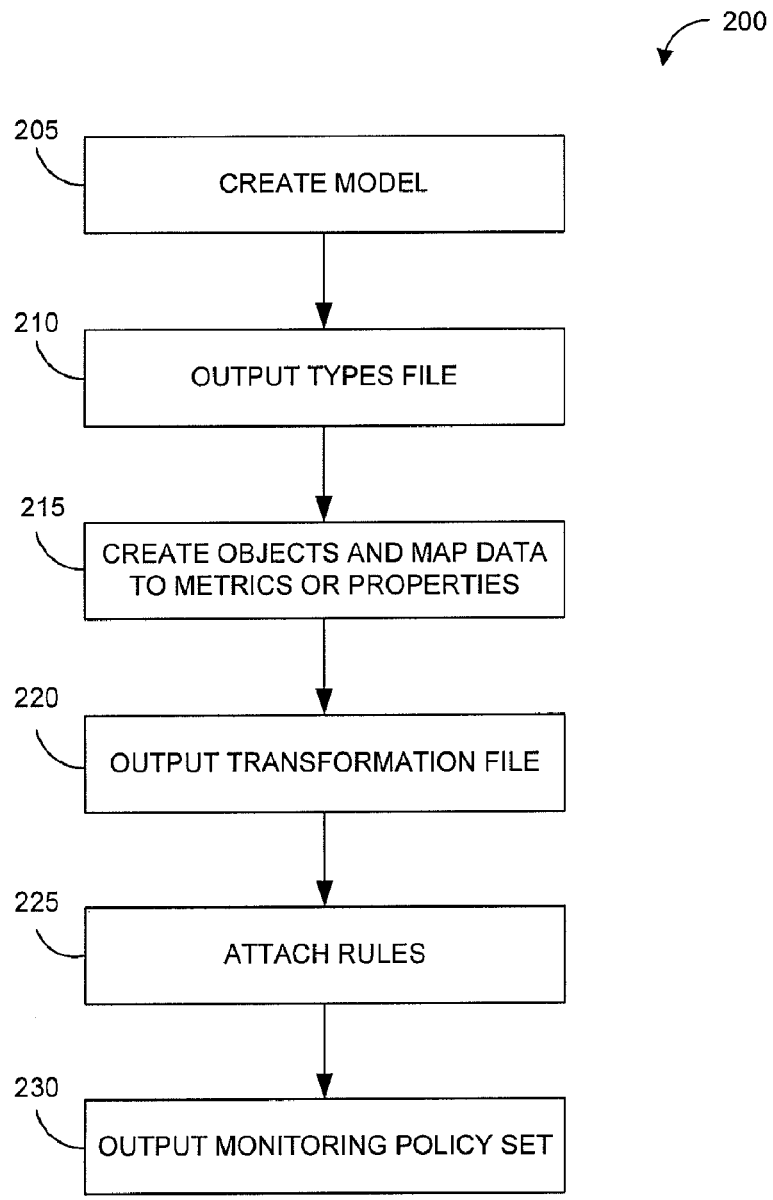
FIG. 2 illustrates a flowchart of an exemplary embodiment of a design time process usable with the modeling system of FIG. 1.

FIG. 2 illustrates a flow chart of a design time process 200 usable with a monitoring system, such as the modeling system 100 of FIG. 1, according to certain embodiments of the invention. In certain embodiments, the design time process 200 is performed prior to or concurrent with the runtime operation of the monitoring system. In particular, the design time process 200 creates one or more files usable during runtime of the modeling system 100 to monitor and/or model data.

The design time process 200 begins at Block 205, wherein a user creates a model, such as a topology model, to be utilized by the modeling system. In certain embodiments, the model comprises one or more data types, such as objects, that represent a particular class of data and/or that have logical associations therebetween. The completed model(s) are output as types files in Block 210.

At Block 215, the design time process 200 creates objects and/or maps data to metrics and/or properties associated with the objects of the particular model contained in the types file to generate a transformation file (Block 220). In certain embodiments, the transformation file advantageously defines how collected data is to be mapped or otherwise associated with a particular model.

At Block 225, the design time process 200 attaches rules to the transformation file to create a monitoring policy set (Block 230).

It will also be understood from the disclosure herein that any number of the above-described blocks may be performed independently to produce data and/or templates usable by a modeling system. For example, models may be created through Blocks 205 and 210 without the subsequent attachment of metrics and/or rules.

Figure 3:
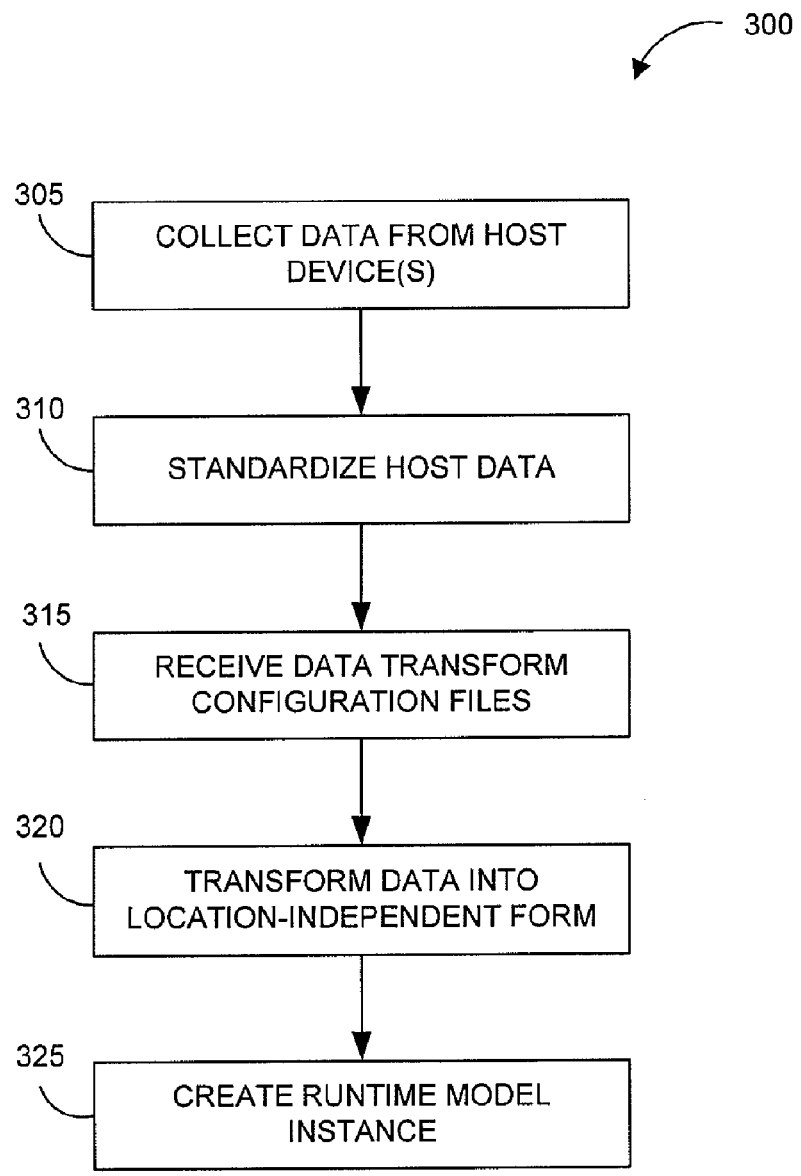
FIG. 3 illustrates a flowchart of an exemplary embodiment of a runtime process usable with the modeling system of FIG. 1.

FIG. 3 illustrates a flow chart of a runtime process 300 usable with a modeling system, according to certain embodiments of the invention. In particular, the runtime process 300 is an exemplary process for creating and/or updating a runtime model instance based on data collected from one or more monitored host resources. For exemplary purposes, the runtime process 300 will be described with reference to the components of the modeling system 100 of FIG. 1.

The runtime process 300 begins collecting data from one or more host devices (Block 305). In certain embodiments, the data is collected by agents 104 from at least one monitored resource 102. At Block 310, the runtime process 300 standardizes the host data so that it can be processed by the data transformation module 108. In certain embodiments, the agent framework 106 includes one or more application programming interfaces (APIs) configured to standardize the data collected by the agent(s) 104.

In certain embodiments, the standardized raw data comprises one or more tags that facilitate mapping the data to specific object(s) in a topology model and/or that enhance an existing topology model with new objects. For example, the one or more tags may be in the form of a complex object associated with the raw data.

Moreover, in certain embodiments, standardizing the raw data comprises grouping different sets of data. In certain embodiments, in order to derive meaningful results from raw data, certain assumptions can be made. For example, to derive a ratio of two raw metrics, one can assume that the source metrics are measured on the same object at the same time. Measured object information can also be implied in the semantic tags of the raw metrics.

At Block 315, the data transformation module 108 receives the standardized data (e.g., from the agent framework 106) and the data transform configuration files from the data model database 110. In certain embodiments, the data transform configuration files comprise a plurality of definitions that dictate how to map the standardized data to preexisting patterns (e.g., topology objects) and/or how to create new objects.

The data transformation module 108 then transforms the raw data into a location-independent form (Block 320). For instance, the raw data can be mapped to a particular object of an existing model. In certain embodiments, the raw data may: (1) map exactly to an object (e.g., a topology object); (2) map to an object but have different values for certain properties; or (3) not map to an existing object. In the first situation, no further action is required as the object is identified, and no changes have occurred. To differentiate between the second two situations, certain properties of particular object type can be marked as forming or defining at least a part of that type's identity. The identity property values can then be used to map information received from agents to existing objects.

For example, for a "Host" type, a "MAC Address" property may define the type's identity (e.g., an "identity property"), whereas an "IP Address" property may not (e.g., a "non-identity property"). In such an embodiment, a change in the IP address of a node may be seen and represented as an update to an existing object. For instance, the IP address change can be represented as metric data.

A change in the MAC address of the host, however, represents a change in an identity property. In certain embodiments, such a change causes the data transformation module 108 to create a new object. Changes made to a property value can also result in a new history record being created for the particular object.

At Block 325, the data transformation module 108 stores in the database 112 a new or modified runtime model instance based on the data transformation of the raw data.

It will be understood from the disclosure herein that the runtime process 300 of FIG. 3 provides an example of a specific runtime process directed to host data. Embodiments of the invention can also perform other runtime processes to transform other or additional types of data. For example, embodiments of the invention disclosed herein may utilize runtime processes to transform application data, database data, or the like.

Figure 4A:
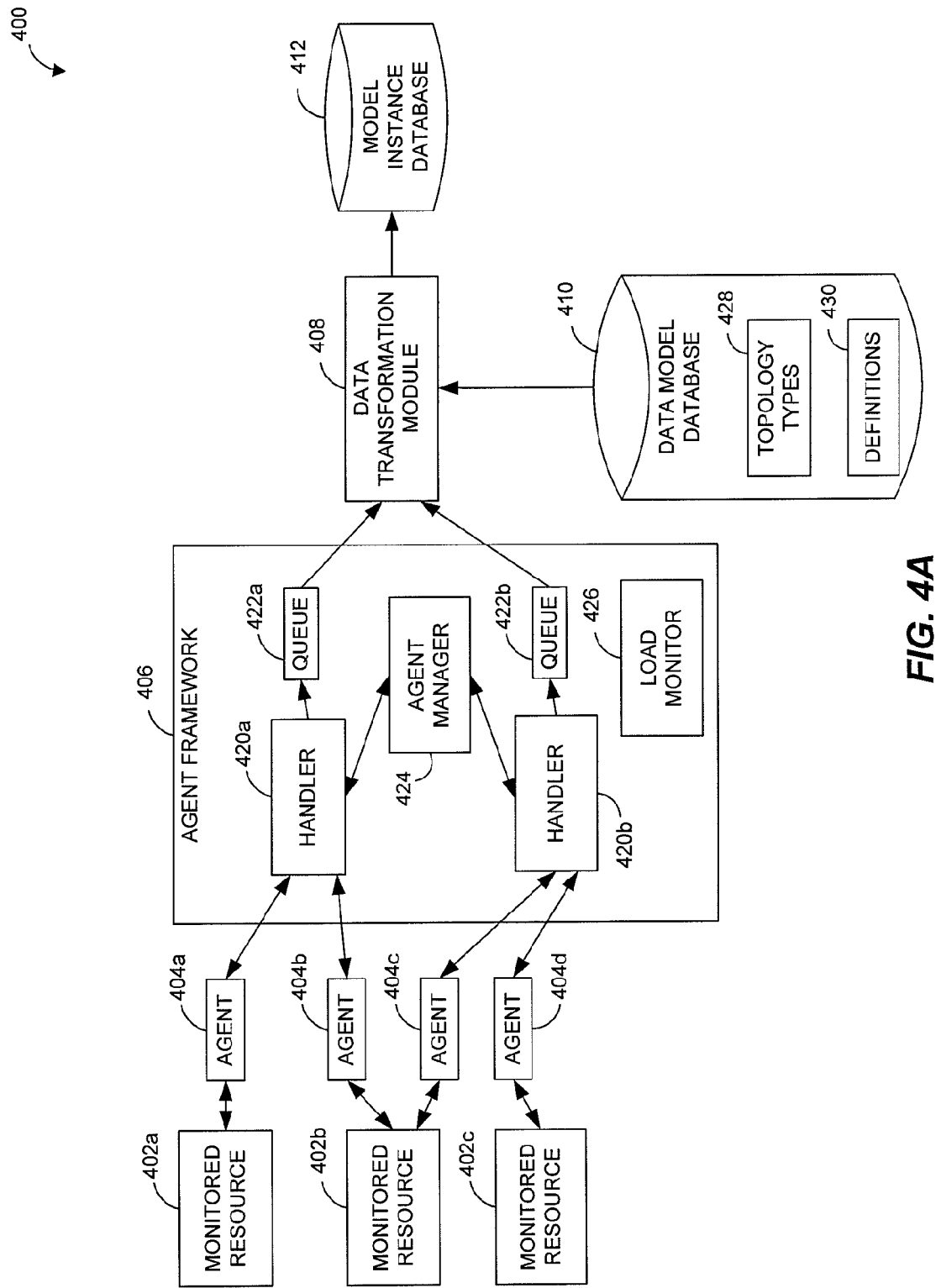
FIG. 4A illustrates a data flow diagram of an exemplary embodiment of a modeling system.

FIG. 4A illustrates an exemplary data flow diagram associated with a modeling system 400, according to certain embodiments of the invention. In certain embodiments, the modeling system 400 is configured to build one or more topology models or model instances by transforming incoming data into a collection-independent form. That is, the modeling system 400 may construct models based on the type and context of data rather than where the data was collected.

As shown, the modeling system 400 includes monitored resources 402a-402c, each of which is associated with data being collected by agents 404a-404d. In particular, agent 404a collects data from monitored resource 402a, agents 404b and 404c collect data from monitored resource 402b, and agent 404d collects data from monitored resource 402c. In certain embodiments, the monitored resources 402a-402c and/or the agents 404a-404d are similar in design and/or function to the monitored resource(s) 102 and agent(s) 104 described with respect to FIG. 1.

The agents 404a-404d are configured to monitor transaction data flow, states, relationships or associations, combinations of the same or the like data related to the assigned monitored resource. For instance, in certain embodiments, one or more of the agents 404a-404d collects raw data from the associated monitored resource(s) 402a-402c.

In certain embodiments, each of the agents 404a-404d is configured to monitor a specific type of data. For example, one or more of the agents 404a-404d may comprise an XML-based agent, a PerformaSure agent, a common object request broker architecture (CORBA) agent (e.g., a service provider interface (SPI) agent), a front end module (FEM) agent, or agents directed to any other protocol usable in a computing system.

Each of the agents 404a-404d communicates with an agent framework 406. In certain embodiments, the agent framework 406 is designed to provide a unified view of data collected by the agents 404a-404d to a data transformation module 408. For instance, in certain embodiments, the agent framework 406 may encapsulate agent communication protocol details and convert data received from agents 404a-404d into a standardized form.

As illustrated, the agent framework 406 further comprises handlers 420a, 420b that communicate with the agents 404a-404d. In particular, handler 420a communicates with agents 404a and 404b, and handler 420b communicates with agents 404c and 404d. In certain embodiments, the handlers 420a and 420b comprise plug-ins that convert the raw data (agent-specific) into the standardized or internal form usable by the data transformation module 408.

In certain embodiments, the agent framework 406 comprises a handler for each type of communications protocol handled by the plurality of agents 404a-404d. The handlers 420a, 420b may also be advantageously configured to receive data from the agents 404a-404d as quickly as possible so as not to cause excessive input/output (I/O) waits in the agents 404a-404d. Such a configuration can advantageously prevent an increase to the agents' performance overhead on the monitored resources 402a-402c. This applies, in particular, to agents that share resources with the monitored resources during their life-cycle (e.g., local operating system monitoring agents or application server agents).

Standardized data is passed from the handler 420a to a queue 422a and from the handler 420b to a queue 422b. In certain embodiments, the queues 422a and 422b advantageously isolate network communications threads from data processing threads. In certain embodiments, this isolation is needed to allow the communications threads to read as much data as possible from agent connections and not make the agents 404a-404d wait on network I/O.

In certain embodiments, the queues 422a, 422b comprise a first-in first-out (FIFO) buffer. In certain embodiments, the queues 422a, 422b can also be configured to discard incoming data if the load on the data transformation module 408 is too high. In such embodiments, the amount of discarded data can be represented as an internal metric of the modeling system 400.

The agent framework 406 further comprises an agent manager 424 in communication with the handlers 420a, 420b. In certain embodiments, the agent manager 424 is configured to function as a bridge between the handlers 420a, 420b and other components of the modeling system 400. For instance, the agent manager 424 can be configured to provide an agent control interface and/or dispatch control commands to all (or select) handlers 420a, 420b according to the configuration and/or the nature of the commands. Such control commands can include, for example: notifications of configuration updates, start/stop monitoring or and/or collection requests, setting monitoring (data collection) levels, combinations of the same or the like.

In certain embodiments, the agents 404a-404d are registered with the agent manager 424. For instance, the agent manager 424 may assign each agent 404a-404d a unique identification. In certain embodiments, the agent identifications are non-transient such that if an agent reconnects to the modeling system 400, the particular agent is assigned the same identification. In such embodiments, the agents 404a-404d can be configured to provide the agent manager 424 and/or associated handler a unique non-transient string agent identifier such as, for example, the agent's host name (if there is only one agent per host).

In certain embodiments, the agent manager 424 is implemented as a service managed bean (MBean) in a server, such as a JBoss application server. In such embodiments, each registered agent can be represented by a JMX MBean. For example, the MBean can expose common agent attributes and/or commands, as well as attributes specific to agents supported by the modeling system 400.

The agent framework 406 of the modeling system 400 further includes a load monitor 426 configured to monitor the load of one or more of the components of the agent framework 406. In certain embodiments, the load monitor 426 is configured to appropriately adjust the volume of incoming data to, for example, prevent a system crash.

In certain embodiments, the load monitor 426 takes into account dynamic-process characteristics that describe how busy the agent framework 406 is. For instance, a server load can be affected both by incoming agent data and by interactions with an associated user interface. In certain embodiments, the load monitor 426 can provide a general metric describing the load of the agent framework 406.

In certain embodiments, the load monitor 426 accounts for dynamic characteristics of the data queues 422a, 422b, such as for example, queue size, queue size growth rate, average time spent by a data packet in the queue, combinations of the same or the like.

In situations wherein a processing-intensive operation is requested by a user, the load monitor 426 can communicate with the agent manager 424 to reduce the amount of data collected from the agents 404a-404d. In certain embodiments, this may include: discarding several data packets received from one or more agents, adjusting sampling orders of one or more agents (e.g., PerformaSure Agents), suspending one or more agents (e.g., SPI Agents), and/or disconnecting one or more agents and reconnecting the agent to a different agent framework.

In certain further embodiments, the load monitor 426 is configured to communicate with independent load sensors (not shown). In such embodiments, each load sensor may describe an aspect of the modeling system 400 (e.g., memory usage, queue growth rate, or the like). The load monitor 426 can then collect and combine the measurements of available load sensors into one or more final values.

With continued reference to FIG. 4A, the agent framework 406 provides the raw data to the data transformation module 408. As discussed above, in certain embodiments, the raw data is provided in a standardized form that allows for more efficient processing by the data transformation module 408. For example, in certain embodiments, the raw data is provided by the agent framework 406 in the form of a raw data tree having multiple interrelated nodes, wherein each node of the data tree is associated with one or more particular metrics or properties. Moreover, the raw data tree can capture information corresponding to how nodes of the tree relate with other nodes. For instance, WEBLOGIC data may be in the form of a data tree having a plurality of branches of nodes, wherein the node of one branch represents server data while the node of another branch represent application data.

In certain embodiments, the data transformation module 408 is configured to process the raw data based on information retrieved from a data model database 410. As shown in FIG. 4A, the illustrated data model database 410 comprises multiple topology types 428, such as identified by a list or other like means. In certain embodiments, the topology types are in a schema-like (e.g. object schema) form. In certain embodiments, the topology types 428 represent template objects to which the data transformation module 408 attempts to create, match, map, or otherwise correlate the raw data received from the agent framework 406. In certain preferred embodiments, the data model database 410 advantageously stores a topology type for each type of object related to the data of the monitored resources 402a-402c. In certain embodiments, topology types 428 can also be dynamically loaded and/or created based on data collected from the monitored resources 402a-402c and/or user input.

In certain embodiments, each of the topology types comprises one or more attributes or fields. Such attributes can comprise elements including, for instance: identification (e.g., value that uniquely identifies the topology object), version, creation timestamp, effective start/end date, owner and/or group identification (e.g., a universally unique identifier (UUID)), security tag (e.g., value that describes permissions associated with the object), combinations of the same or the like.

It is contemplated that, in other embodiments, the data model database 410 may store data types other than, or in addition to, the topology types 428. For example, the database 410 may store types created specifically to represent one or more monitored resources for a custom application that exists in a specific IT environment. For instance, objects may be created for representation of a single application run by one user.

The illustrated data model database 410 further includes definitions 430 that specify how to match the raw data with generic data patterns, such as patterns comprising multiple topology types or objects. In general, the definitions enable the data transformation module 408 to match the standardized raw data with one or more stored patterns and then to perform at least one operation based on a recognized match. In certain embodiments, the definitions include a plurality of canonical data transform (CDT) configurations. For instance, one or more CDT configurations can be associated with one or more topology model templates. In certain embodiments, the model templates are generic so as to describe a wide variety of data having objects, relationships, attributes and/or elements.

For example, in certain embodiments, the CDT configuration is in the form of a data tree to reflect the expected structure of a particular set of collected data. In certain embodiments, specific instances of the CDT configurations are configured in XML.

As discussed above, in certain embodiments, the data transformation module 408 is configured to process the raw data based on information retrieved from the data model database 410. For instance, as described in more detail herein, the data transformation module 408 can be configured to perform one or more of the following actions: create one or more objects, set at least one property on one or more objects, attach metrics to one or more objects, organize the raw data into collections and/or attach the data as observation sets, ignore the data, combinations of the same or the like.

In certain embodiments, the data transformation module 408 is configured to create an association between multiple objects. In such embodiments, three pieces of information may be needed to create an association: a source object, a target object and a reference property used to link the two together.

In certain embodiments, the data transformation module 408 may access multiple models in performing its data transform operations. For instance, a collection model may represent and/or be created from a collection of data. In certain embodiments, the layout of the collection model reflects the layout of the environment in which the data was collected (e.g., the particular agent's view of the monitored environment). One type of collection model, a monitoring model, reflects the collection of data in a single collection domain, such as, for example, a WEBLOGIC, WEBSPHERE, ORACLE, WINDOWS NT system, or other like domain. In certain embodiments, the monitoring models can be shared between multiple domains.

Internal models can also be used to collect data on the modeling system 400 itself. For instance, an internal model may reflect how much data is being discarded in the queues 422a, 422b due to loads on the data transformation module 408.

End users may also have their own conceptual view of the monitored environment, which may differ from the structure of the collection model. Embodiments of the invention allow a user to construct new models that represent their conceptual view of the monitored system by assembling other existing model elements. For example, these custom models can be constructed interactively by the user choosing the pertinent model objects and arranging them into a new model. In certain embodiments, user models may comprise a model created on top of one or more collection models. For instance, a user model may comprise an application model that allows a user to organize elements of his or her collection models into a virtual application.

Certain embodiments of the invention allow users to specify a set of criteria for assembling a custom model. For example, the data transformation module 408 may automatically make the model changes based on definitions related to the criteria. For instance, a customized model that contains a representation of all UNIX hosts in a system can be associated with a definition that detects when new hosts come online and adds any UNIX hosts to the custom model. Also, since the criteria is not exclusively tied to specific collection model objects, the criteria can be imported into other environments to construct equivalent models.

With continued reference to FIG. 4A, the data transformation module 408 is configured to store at least one new and/or modified model or model instance in a model instance database 412. It will be understood from the disclosure herein, however, that the data transformation module 408 can be configured to store model data in various types data repositories, such as, for example, an object repository (e.g., an object database), one or more files (e.g. flat files, combinations of the same or the like.

As will be appreciated, in certain embodiments, the modeling system 400 provides several advantages over traditional monitoring systems. For instance, the modeling system 400 allows for a single piece of raw data to be processed by multiple CDT configurations. For example, the same raw data can be associated with multiple models, used to create and/or modify different objects of different models, attach metrics to multiple objects, combinations of the same or the like. Moreover, because the raw data is processed in a location-independent form, data collected from different locations can be associated with the same object.

Moreover, although the modeling system 400 has been described with reference to particular arrangements, other embodiments are also possible, For instance, the data model database 410 and the model instance database 412 may be combined into a single database. Moreover, in other embodiments, other types of models may be used including, but not limited to, models representing business processes, network hardware, physical locations, end user groups (e.g., "gold users," "platinum users," remote users), combinations of the same or the like.

Figure 4B:
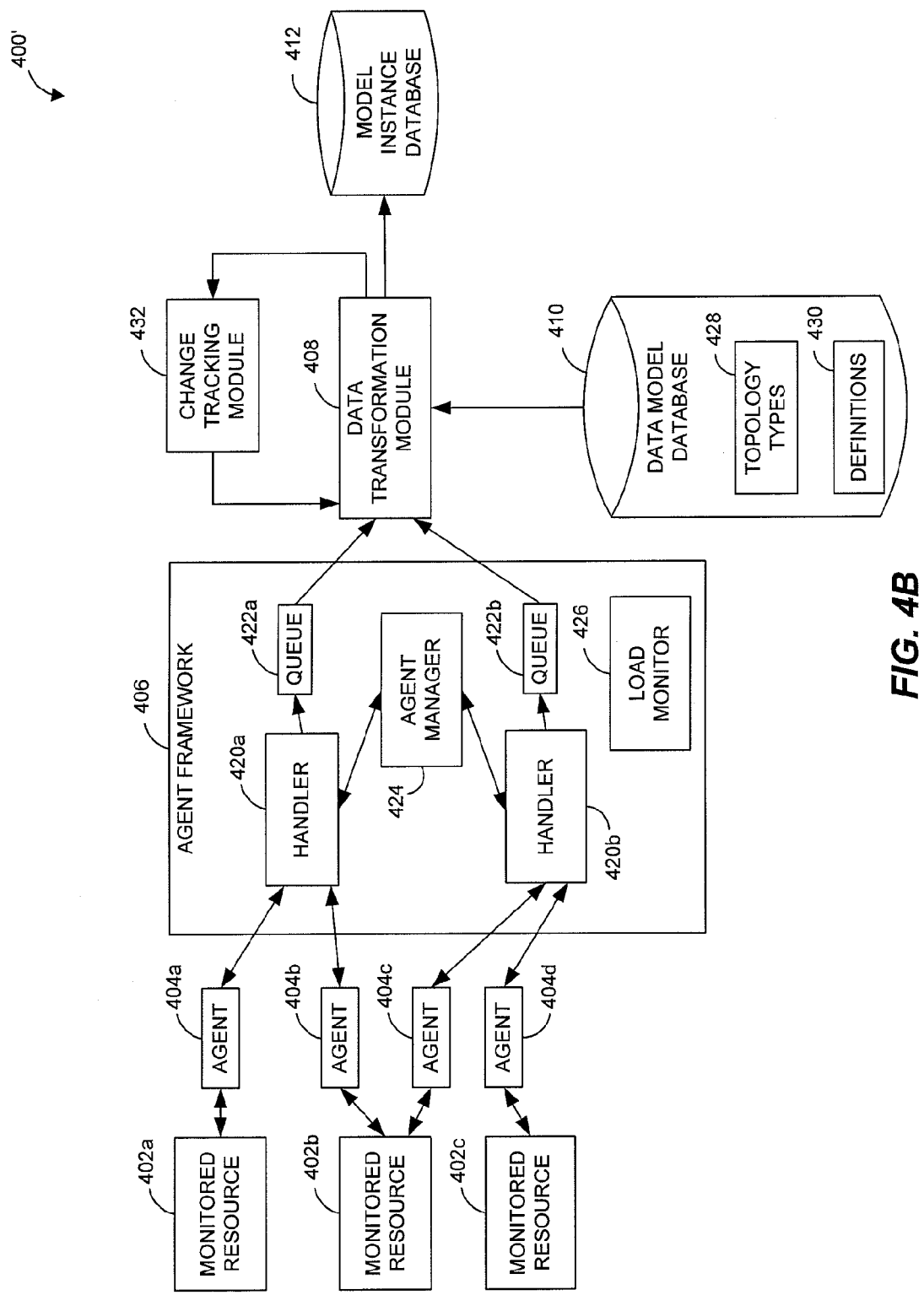
FIG. 4B illustrates a data flow diagram of another exemplary embodiment of a modeling system.

FIG. 4B illustrates an exemplary data flow diagram associated with another modeling system 400', according to certain embodiments of the invention. In certain embodiments, the modeling system 400' comprises similar modules to the modeling system 400 of FIG. 4A and is configured to build one or more topology models or model instances by transforming incoming data into a collection-independent form. To simplify the description, components and/or modules of the modeling system 400' will not be redescribed in detail if they were described above.

The modeling system 400' is further capable of creating a new object and/or model based on one or more changes to existing models and/or creation of new objects. In general, when a new model object is created, deleted or modified, the modeling system 400' can bind data transformations corresponding to that particular model to one or more events. These events may then be used by the data transformation module 408 to modify one or more other models and/or objects.

As shown in FIG. 4B, the output of the data transformation module 408 is further coupled to a change tracking module 432. In certain embodiments, the change tracking module 432 is configured to monitor events associated with particular changes in one or more objects of existing models. The change tracking module 432 then communicates this change information back to the data transformation module 408 for possible additional processing and correlation (e.g., the creation and/or modification of objects).

For example, suppose a user creates a service (e.g., a model) to contain all the host computing devices located in Toronto, Canada. When a new host computing device is added to the monitored computing environment, the data transformation module 408 creates a new object to represent the added host device. The change tracking module 432, which is configured to monitor changes to existing model objects and/or the addition of new objects, detects through an output of the data transformation module 408 the addition of the new host device (e.g., through a "host added" event). If the added host device is located in Toronto, the change tracking module 432 detects this event (e.g., such as by monitoring "host added" events with a location property of "Tor*"). The change tracking module 432 then forwards this information to the data transformation module 408, which updates the user-defined model representing the host computing devices in Toronto by adding an object representing the newly added host device.

Figure 5:
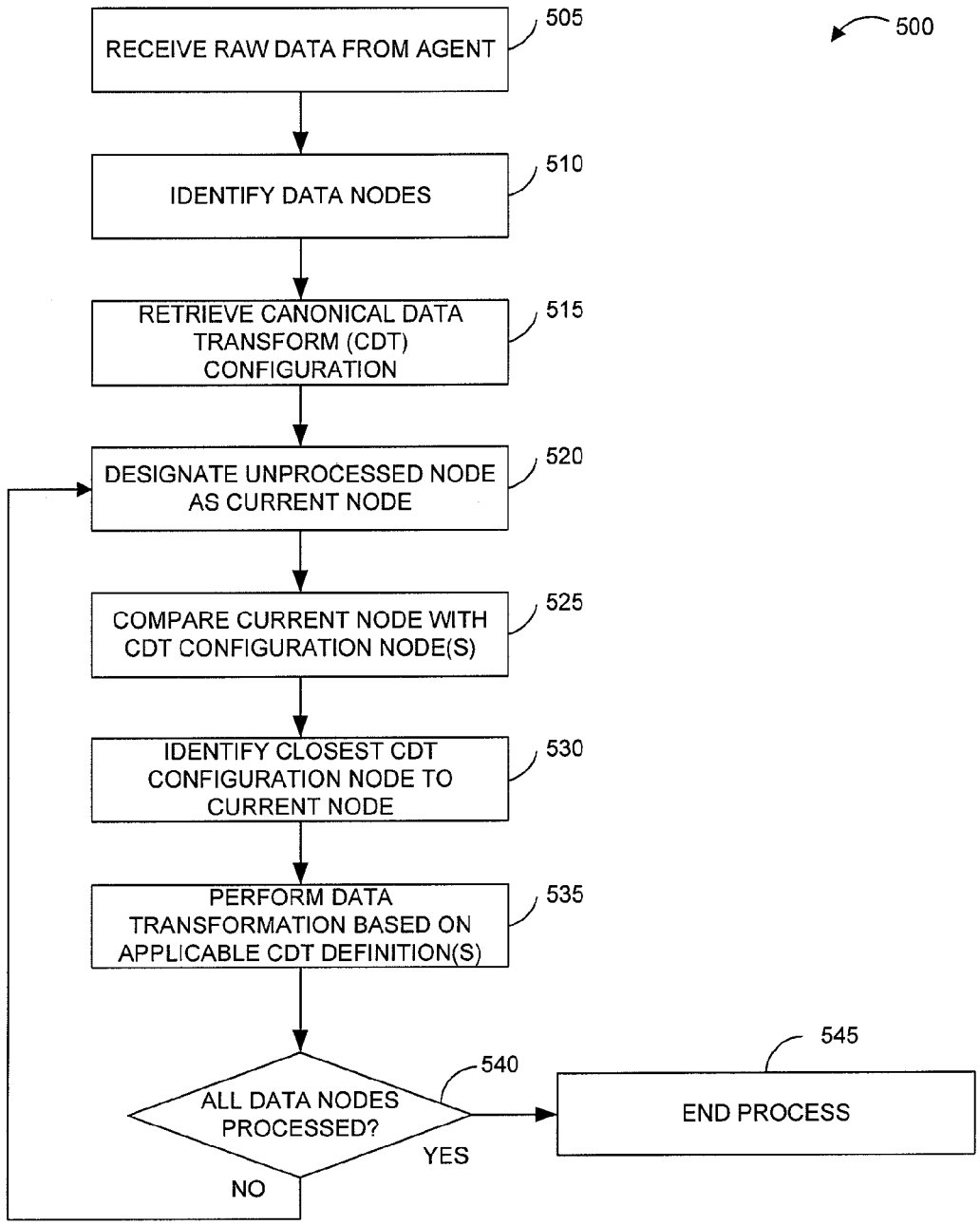
FIG. 5 illustrates a flowchart of an exemplary embodiment of a transformation process usable with the modeling systems of FIGS. 1, 4A and 4B.

FIG. 5 illustrates a flowchart of a data transformation process 500 usable by a modeling system according to certain embodiments of the invention. In certain embodiments, the data transformation process 500 is performed by one or more execution threads of one or more servers. For exemplary purposes, the data transformation process 500 will be described herein with reference to the data transformation module 408 of the modeling system 400 of FIG. 4A.

The data transformation process 500 begins at Block 505 wherein the data transformation module 408 receives data from one or more agents. In certain embodiments, the data comprises raw data tree having a plurality of nodes. At Block 510, the data transformation module 408 identifies each of the data nodes of the raw data tree. For instance, each node may be associated with a unique value (e.g., a name or identifier).

Continuing with Block 515, the data transformation module 408 retrieves one or more CDT configurations from the data model database. For example, the CDT configuration can comprise a topology model, or other template, having a plurality of nodes that reflect the expected structure, or pattern, of the raw data collected by a particular agent. During Block 515, the data transformation module 408 may also obtain definitions that indicate how the raw data should be processed in view of the topology model.

At Block 520, the data transformation module 408 designates one of the unprocessed data nodes of the raw data tree as the "current" node. In certain embodiments, the data transformation module 408 advantageously begins at the top of the raw data tree and works down individual branches until all the nodes of the data tree are traversed and/or processed.

At Block 525, the data transformation module 408 compares the current data node with one or more CDT configuration nodes. For instance, in certain embodiments, the data transformation module 408 attempts to determine a "match" or correspondence between the current data node and a CDT configuration node. When utilizing tree structures, the data transformation module 408 may advantageously initially examine the child nodes of a previously selected CDT configuration node, if any. In such embodiments, it is likely that the current raw data node, if it is the child of a previously matched raw data node, corresponds to a child of a previously matched CDT configuration node.

At Block 530 of the data transformation process 500, the data transformation module 408 selects the "closest" CDT configuration node to the current raw data node. Such a selection may be based at least on a unique identifier, a name, select properties or attributes, combinations of the same or the like.

The data transformation module 408 then performs data one or more data transform operations on the current raw data node based on definitions, files, instructions, and/or other information associated with the selected CDT configuration node (Block 535). For instance, in certain embodiments, the data transformation module 408 can perform one or more of the following actions: create one or more topology objects associated with one or more topology models and/or model instances, update or modify properties of one or more topology objects, create or delete one or more associations between topology objects, attach metrics to one or more topology objects, merge one or more topology objects of one or more topology models, or the like. Moreover, if there is an exact match between the current raw data node and the selected CDT configuration node, the current raw data node data may be discarded as being duplicative or redundant.

In certain embodiments, the data transformation module 408 may not find a corresponding CDT configuration node to the current raw data node at Block 530. In such embodiments, the data transformation module 408 may discard the data of the current raw data node, create one or more new topology objects based on the unmatched raw data, topology types, or the like, at Block 535. Such actions may be based on, for example, definitions stored in the data model database 410, user input, combinations of the same or the like.

At Block 540, the data transformation module 408 determines if there are other unprocessed data nodes of the raw data tree. For instance, the data transformation module 408 may determine if there are any child nodes associated with the current raw data node. If there are still remaining unprocessed nodes, the data transformation process 500 returns to Block 520 and designates a new raw data node as the "current" node.

If all of the raw data nodes have been processed by the data transformation module 408, the data transformation process 500 terminates (Block 545).

Figure 6:
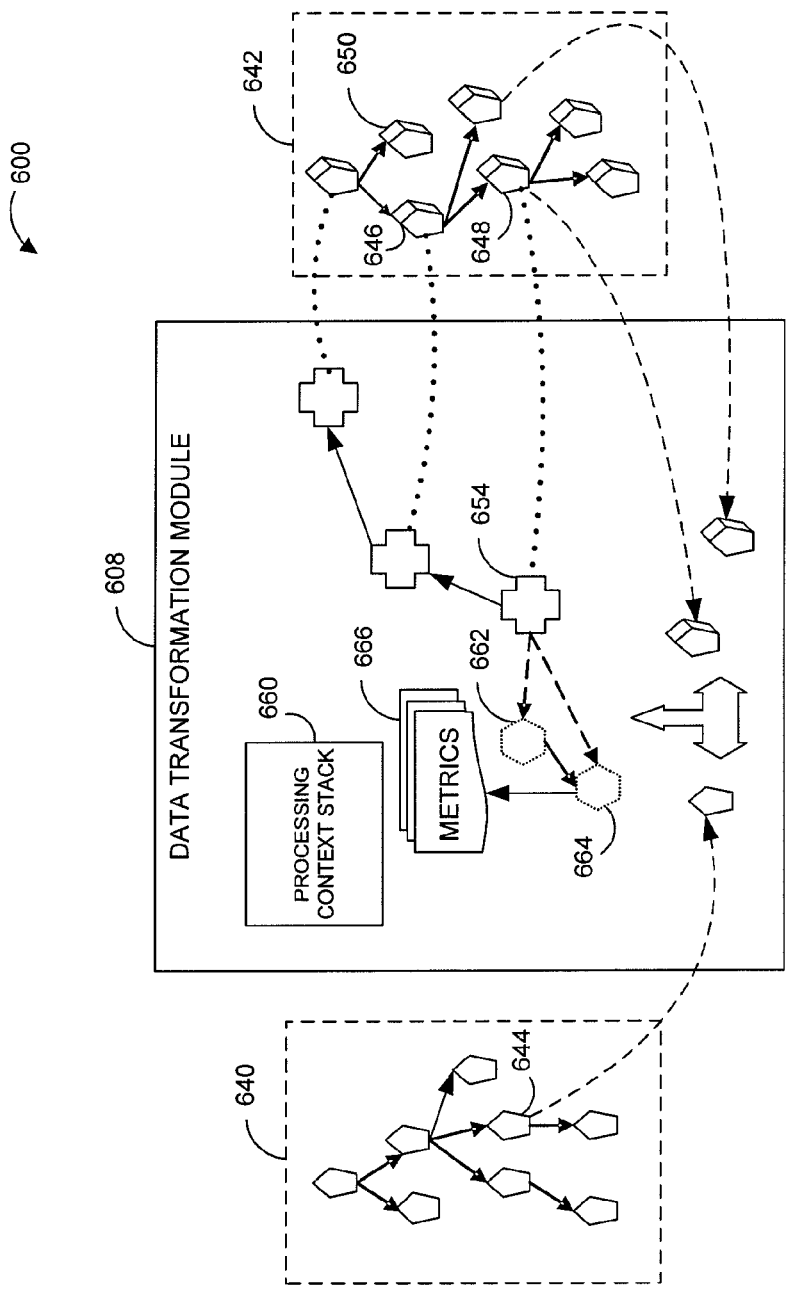
FIG. 6 illustrates a diagram of an exemplary embodiment of a data transform operation usable by the modeling systems of FIGS. 1, 4A and 4B.

FIG. 6 illustrates a diagram of an exemplary embodiment of a data transform operation 600 in which information from raw data nodes is used to construct topology object(s) and metrics according to a specific CDT configuration. In general, the data transform operation 600 comprises iterating over the incoming raw data tree and performing pre-configured actions on each data node. For exemplary purposes, the data transform operation 600 will be described with reference to the components similar to those of the modeling system 400 of FIG. 4A.

As illustrated, the data transform operation 600 includes a data transformation module 608 that retrieves information from both a raw data tree 640 and a CDT configuration 642 including configuration nodes 646, 648 and 650. The raw data tree 640 includes a plurality of data nodes as obtained by one or more agents and provided by an agent framework. The CDT configuration also comprises a tree of nodes. In certain embodiments, the structure of the CDT configuration reflects the expected data structure of the data coming from a particular agent.

During the data transform operation 600, each of the data nodes of the data tree 640 is named. For instance, such naming may be performed by the data transformation module 608 and/or an agent framework. In certain embodiments, each node may also be associated with zero or more floating point values, name, and/or timestamps that identify the time period to which the value applies (e.g., start time, end time).

At each step in the iteration over the raw data tree 640, information about a current node is passed to the data transformation module 608. In particular, FIG. 6 illustrates a current data node 644 of the raw data tree 640, which is passed to the data transformation module 608, and a current configuration node 646. During processing, the data transformation module 608 compares the current data node 644 with each of the child nodes of the current configuration node 646. In certain embodiments, the data transformation module 608 chooses the child configuration node that matches and/or is closest to the current data node 644 (illustrated as configuration node 648). For instance, the data transformation module 608 can select the child configuration node associated with the same name as the current data node name.

In certain embodiments, upon finding a match, the data transformation module 608 pushes a new processing context node 654 onto a processing context stack 660. As illustrated in FIG. 6, each context node is linked with the particular configuration node that was used to produce it. In this manner, the data transformation module 608 is able to keep track of which configuration node is the "current" configuration node.

In certain embodiments, when the raw tree iteration exits from a sub-tree, the corresponding context is popped from the processing context stack 660. This, in turn, resets the "current" configuration node of the CDT configuration 642.

In certain embodiments, one or more of the configuration nodes of the CDT configuration 642 defines actions to be performed on the raw data. For example, such action may include creating and/or updating a topology object, modifying a topology model, assigning and/or updating metrics associated with a topology object, discarding data, combinations of the same or the like. As shown in FIG. 6, the configuration node 648 causes topology objects 662, 664 and metrics 666 to be associated with the processing context node 654.

Figure 7:
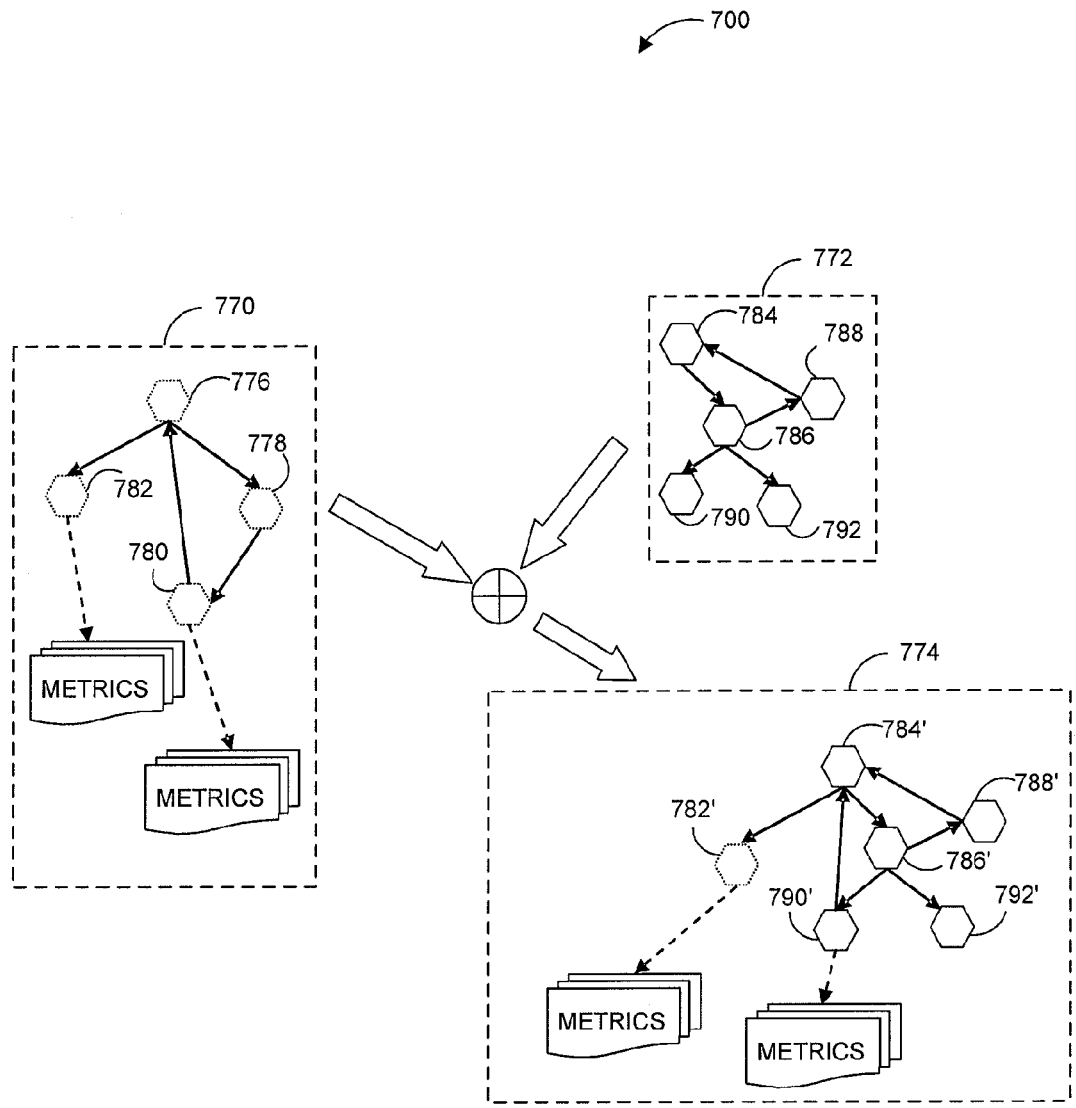
FIG. 7 illustrates a diagram of an exemplary embodiment of a topology model merge process usable by the modeling systems of 1, 4A and 4B.

FIG. 7 illustrates a diagram of a topology object merge process 700, according to certain embodiments of the invention. In particular, the merge process 700 provides an example of a result from the data transformation process in a modeling system, such as is performed by the data transformation module 408 of modeling system 400 of FIG. 4A. For instance, FIG. 7 illustrates the merging of a set 770 of newly created topology objects with an existing topology model 772 to form an updated topology model 774.

In certain embodiments, the merge process 700 comprises (1) finding and/or updating existing topology objects based on their identity or (2) creating new topology objects if the existing topology model 772 does not yet have a corresponding topology object (e.g., a topology object with a particular identification). Moreover, the merge process 700 may include the creating and/or updating of topology object relationships.

As illustrated, the new set 770 of topology objects comprises topology objects 776, 778, 780 and 782. FIG. 7 further illustrates the following object relationships between the newly created topology objects: object 776 to object 778, object 778 to object 780, object 780 to object 776, and object 776 to object 782. Topology objects 780 and 782 are further illustrated as being associates with metrics.

With reference to the existing topology model 772, FIG. 7 depicts the following object relationships between the existing topology objects: object 784 to object 786, object 786 to object 788 and object 788 to object 784. Object 786 is further related to two other topology objects 790 and 792.

As discussed above, in certain embodiments, the data transformation module merges the set of newly created topology objects 770 with the existing topology model 772 to form the updated topology model 774. For example, in the illustrated embodiment, newly created topology objects 776, 778 and 780 are mapped and/or matched with existing topology objects 784, 786 and 790, respectively. Thus, in the updated topology model 774, those existing topology objects along with existing topology objects 788 and 792 remain unaffected by the merge (identified as 784', 786', 790', 788' and 792', respectively).

Topology object 782', however, is added to the updated topology model 774 based on the newly created topology object 782, which has no matches with the objects of the existing model 782. In addition, a new relationship is created between topology object 790' and topology object 784' based on the relationship between newly created topology objects 780 and 776. Moreover, metrics are associated with the topology objects 782' and 790' as a result of the merge.

In certain embodiments, the modeling system performing the merge process 700 may emit one or more change events as the result of one or more topology changes. For example, the new relationship created between topology objects 784' and 790' may cause the modeling system to notify the user that a configuration change has occurred. Such notification may be in the form of a configuration change event, similar to an alarm, alert, or other like means.

In certain embodiments, configuration change events are emitted when there is a change of a non-identity property. In such an embodiment, a user of the modeling system may advantageously utilize the configuration change event information to identify and/or diagnose particular problems that may result from the change in the non-identity property. For example, suppose an IP address (e.g., a non-identity property) of a host device changes, and as a result, a particular application hardwired to the old IP address becomes unavailable. In such an embodiment, a configuration change event emitted based on the IP address change may advantageously enable the user to diagnose and correct the resulting application failure.

It will be understood that FIG. 7 is for exemplary purposes to assist in conceptualizing the merge process 700 and that the illustrated merge process 700 may be performed in a variety of manners in different embodiments of the invention. For example, it will be understood that the merge process 700 may be performed over an extended period of time and that the merging/matching of each newly created topology object with the existing topology model 772 may occur individually (e.g., with the creation of each newly created topology object). Moreover, it is contemplated that topology objects need not even be created from raw data by the data transformation module if there is already a corresponding existing topology object. Rather, the data transformation module can take no action, update relationships, add metrics or the like.

In certain embodiments of the invention, multiple topology models may also be combined into one or more aggregate models to suit the needs and/or views of a particular user. For instance, multiple topology models can be combined based on one or more of the following: application groupings, logical groupings, organizational groupings, geographical groupings, or the like. In such embodiments the user may define what states are propagated between models, what property changes are tracked, or the like.

The foregoing disclosure has oftentimes partitioned devices and system into multiple modules (e.g., components, computers, servers) for ease of explanation. It is to be understood, however, that one or more modules may operate as a single unit. Conversely, a single module may comprise one or more subcomponents that are distributed throughout one or more locations. Furthermore, the communication between the modules may occur in a variety of ways, such as hardware implementations (e.g., over a network, serial interface, parallel interface, or internal bus), software implementations (e.g., database, passing variables), or a combination of hardware and software.

Moreover, in certain embodiments, the systems and methods described herein can advantageously be implemented using computer software, hardware, firmware, or any combination of software, hardware, and firmware. In one embodiment, the system is implemented as a number of software modules that comprise computer executable code for performing the functions described herein. In one embodiment, the computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers.

A skilled artisan will also appreciate, in light of this disclosure, that multiple distributed computing devices can be substituted for any one computing device illustrated herein. In such distributed embodiments, the functions of the one computing device are distributed such that some functions are performed on each of the distributed computing devices.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for dynamically modeling and monitoring performance data in a computing environment, the method comprising:

by a computer system comprising computer hardware:
receiving performance data collected by at least one agent module from multiple applications executing in multiple servers in a computing environment, wherein the performance data includes a first data tree including a plurality of different types of data nodes, wherein the different types of data nodes are associated with different time series metrics about the multiple servers and the multiple applications executing in the multiple servers;
automatically accessing a first model template of a plurality of model templates wherein the model template includes a topology of configuration nodes representing the expected structure of the performance data;
automatically comparing properties of each of the plurality of different types of data nodes of the first data tree with properties of the configuration nodes of the first model template to identify matches between at least a portion of the plurality of different types of data nodes and a portion of the configuration nodes;
automatically generating a modified model of the first model template that includes the topology of configuration nodes in the first model template that match the structure of the plurality of different types of data nodes in the first data tree, wherein the modified model includes a plurality of interconnected topology objects representing the multiple applications executing in the multiple servers of the computing environment; and
storing the modified model in a data repository.

2. The method of claim 1, wherein the automatically generating the modified model includes for each one of the different types of data nodes in the first data tree:
identifying a corresponding configuration node, if any, of the plurality of configuration nodes; and
performing a data transform operation on a data node associated with the corresponding configuration node, the data transform operation being based on the definition associated with the corresponding configuration node.

3. The method of claim 1, additionally comprising:
accessing a second model template of the plurality of model templates different from the first model template;
generating a second modified model including a plurality of second interconnected topology objects based at least in part on the performance data and the second model template; and
storing the second modified model in the data repository.

4. The method of claim 3, additionally comprising receiving user input to generate a third model based on the plurality of interconnected topology objects of the first modified model and the plurality of second interconnected topology objects of the second modified model.

5. The method of claim 1, wherein the at least one agent module includes a first agent module and a second agent module, and wherein the generating includes matching performance data collected by the first agent module with performance data collected by the second agent module.

6. The method of claim 5, wherein the generating includes associating matching data from the first and second agent modules with a single topology object of the plurality of interconnected topology objects of the modified model.

7. The method of claim 1, wherein the modified model includes a model instance.

8. The method of claim 7, additionally comprising applying one or more rules to data of the model instance.

9. The method of claim 1, additionally comprising modifying a second model based on changes made while generating the modified model.

10. The method of claim 1, additionally comprising generating a user notification when the generating includes modifying a non-identity property of one of the plurality of interconnected topology objects.

11. A system for monitoring data in a computing environment, the system comprising:
an agent module executing on a computing device and configured to obtain from at least one computing resource raw data regarding a performance of multiple applications executing in multiple servers in a computing environment, the raw data including a first data tree including a plurality of different types of data nodes, wherein the different types of data nodes are associated with different time series metrics about the multiple servers and the multiple applications executing in the multiple servers;
a database storing a plurality of data transform configurations, each data transform configuration including a topology of configuration nodes representing a standardized data structure of the raw data; and
a data transformation module implemented in one or more computer processors, the data transformation module configured to:
receive the raw data collected by the agent module;
automatically compare properties of each of the plurality of different types of data nodes of the first data tree with properties of the configuration nodes of a selected data transform configuration to identify matches between at least a portion of the plurality of different types of data nodes and a portion of the configuration nodes; and
transform the raw data into a modified model of the selected data transform configuration that includes the topology of the configuration nodes of the selected data transform configuration that match a structure of the plurality of different types of data nodes in the first data tree, wherein the modified model includes a plurality of interconnected topology objects representing the multiple applications executing in the multiple servers in the computing environment.

12. The system of claim 11, wherein the data transformation module is configured to merge a new topology object with existing topology objects to form topological relationships.

13. The system of claim 11, wherein the data transformation module is configured to attach metrics to at least one of the plurality of interconnected topology objects.

14. A method for dynamically modeling performance data in a computing environment, the method comprising:
by a computer system comprising computer hardware:
automatically receiving performance data collected by at least one agent module from multiple applications executing in multiple servers in a computing environment, the performance data associated with different time series metrics about the multiple servers and the multiple applications executing in the multiple servers, and the performance data including a performance data structure representing topological relationships between the different time series metrics about the multiple servers and the multiple applications executing in the multiple servers;
automatically accessing a first model template, wherein a structure of the first model template reflects an expected structure of the performance data;
automatically generating a modified model based at least in part on the performance data associated with matches between at least a portion of the performance data structure and at least a portion of the expected structure, the modified model including a plurality of topology objects; and
storing the modified model in a data repository.

15. The method of claim 14, wherein the performance data includes a data tree having a plurality of data tree nodes.

16. The method of claim 15, wherein the first model template includes a data tree structure having a plurality of configuration nodes.

17. The method of claim 16, wherein the generating further comprises for each one of the plurality of data tree nodes:
identifying a corresponding configuration node, if any, of the plurality of configuration nodes; and
performing a data transform operation on the corresponding one of the plurality of data nodes, the data transform operation being based on at least one definition associated with the corresponding configuration node.

18. The method of claim 17, wherein the data transform operation includes creating a new topology object.

19. The method of claim 17, wherein the data transform operation includes associating metrics to an existing topology object.

20. The method of claim 17, wherein the data transform operation includes creating an association between two existing topology objects.

* * * * *

UNITED STATES PATENT AND TRADEMARK OFFICE
CERTIFICATE OF CORRECTION

PATENT NO. : 8,175,862 B1  
APPLICATION NO. : 13/179405  
DATED : May 8, 2012  
INVENTOR(S) : Bourlatchkov et al.

Page 1 of 1

It is certified that error appears in the above-identified patent and that said Letters Patent is hereby corrected as shown below:

On the Title Page: (Item 75) (Inventors) at line 4, Change "Steven" to --Stephen--.

Signed and Sealed this
Second Day of October, 2012

David J. Kappos
*Director of the United States Patent and Trademark Office*